(12) United States Patent
Lin et al.

(10) Patent No.: US 10,365,442 B2
(45) Date of Patent: Jul. 30, 2019

(54) OPTICAL HOUSING FOR HIGH POWER FIBER COMPONENTS

(71) Applicant: NATIONAL CHUNG SHAN INSTITUTE OF SCIENCE AND TECHNOLOGY, Taoyuan (TW)

(72) Inventors: Chiang-Hsin Lin, Taoyuan (TW); Wei-Ting Lin, Taoyuan (TW); Jian-Hung Lin, Taoyuan (TW); Po-Tse Tai, Taoyuan (TW); Wei-Chung Yen, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 16/112,842

(22) Filed: Aug. 27, 2018

(65) Prior Publication Data

US 2019/0146159 A1    May 16, 2019

(30) Foreign Application Priority Data

Nov. 10, 2017   (TW) .............................. 106138941 A

(51) Int. Cl.
    *G02B 6/36*       (2006.01)
(52) U.S. Cl.
    CPC ......... *G02B 6/3648* (2013.01); *G02B 6/3636* (2013.01)
(58) Field of Classification Search
    CPC ....................... G02B 6/3636; G02B 6/3648
    See application file for complete search history.

(56) References Cited

U.S. PATENT DOCUMENTS

| 4,818,055 | A  | * | 4/1989  | Patterson  | G02B 6/3636 385/98 |
| 5,444,804 | A  | * | 8/1995  | Yui        | G02B 6/30 385/49   |
| 5,696,860 | A  | * | 12/1997 | Semura     | G02B 6/30 385/49   |
| 6,430,350 | B1 | * | 8/2002  | Bookbinder | G02B 6/0218 385/136 |
| 6,865,316 | B1 | * | 3/2005  | Pratt      | G02B 6/4296 385/27  |
| 8,027,555 | B1 | * | 9/2011  | Kliner     | G02B 6/2852 385/29  |
| 8,355,608 | B2 | * | 1/2013  | Hu         | G02B 6/14 385/134   |

(Continued)

FOREIGN PATENT DOCUMENTS

| EP | 1308762 A1 | 5/2003 |
| EP | 2402801 A2 | 1/2012 |

*Primary Examiner* — Daniel Petkovsek
(74) *Attorney, Agent, or Firm* — Schmeiser, Olsen & Watts, LLP

(57) ABSTRACT

An optical housing for high power fiber components includes an upper cover, a lower base, and two isolating members. The upper cover includes a light-reflecting portion for containing the optical fiber and receiving and reflecting the light therefrom. The lower base is connected with the upper cover and includes a light-receiving portion which corresponds to the light-reflecting portion in position and surrounds the optical fiber, thereby receives the light from the light-reflecting portion. The isolating members are disposed between the upper cover and the lower base and located on two sides of the optical housing to prevent the leakage of light from the optical fiber.

7 Claims, 2 Drawing Sheets

(56) References Cited

U.S. PATENT DOCUMENTS

| | | | |
|---|---|---|---|
| 9,547,121 B2* | 1/2017 | Hou | H01S 3/094007 |
| 9,897,768 B2* | 2/2018 | Kasai | G02B 6/42 |
| 2018/0261714 A1* | 9/2018 | Taniguchi | H01L 31/12 |

* cited by examiner

OPTICAL HOUSING FOR HIGH POWER FIBER COMPONENTS

CROSS-REFERENCE TO RELATED APPLICATION

This non-provisional application claims priority under 35 U.S.C. § 119(a) on Patent Application No. 106138941 filed in Taiwan, R.O.C. on Nov. 10, 2017, the entire contents of which are hereby incorporated by reference.

FIELD OF THE INVENTION

The present disclosure relates to an optical housing, and in particular to an optical housing for high power fiber components which reflects the light of an optical fiber to dissipate the heat thereof.

BACKGROUND OF THE INVENTION

The optical fibers used in signal transmission is an emerging application further to the electric cable. Nowadays, with the advantage of high transmission efficiency, the optical fiber has played a decisive role in modern technology. The optical fiber used in signal transmission is to carry or transmit energy for applying to industrial purposes, such as welding, laser cutting or other precision machining operations.

The carrying load of energy of high-power optical fibers is distinctly higher than general uses. Therefore, such high-power optical fibers must be equipped with an external heat dissipation mechanism, otherwise the high temperatures will cause other components failure and even the damage to the system.

To dissipate the heat of the high-power optical fibers, a package structure of the optical fiber in prior art was provided. In the package structure, the optical fiber is surrounded by the substrate with high thermal conductivity, and the optical fiber is connected with the substrate by two ends to ensure the heat exchange with the substrate. However, since the low conductivity of heat of the adhesive, the heat exchange between the optical fiber and the substrate is inefficient. This disadvantage results in the thermal stress and therefore the breakage of the package structure. Furthermore, to avoid the issue caused by the different coefficients of thermal expansion, the material of each component, and the bonding length of the substrate and the optical fiber are also constrained. Consequently, the package structure in prior art is not conducive to design and with high risk of failure.

Another prior art is to replace the aforementioned package structure with a cavity coated with a power dissipative material (such as a UV-cured low refractive index polymer or an epoxy resin), and bond the optical fiber with high refractive index epoxy resin at both ends of the package structure. The coating material in the cavity will limit the applicable field of the optical fiber. Moreover, in particular parts the optical fiber is temperature sensitive and therefore inappropriate for bonding, this leads the adhesives and these parts of the optical fiber must be staggered in position when bonding so makes the package structure longer.

SUMMARY OF THE INVENTION

According to one aspect of the present disclosure, an optical housing for high power fiber components includes an upper cover, a lower base, and two isolating members. The upper cover includes a light-reflecting portion for containing the optical fiber and receiving and reflecting the light therefrom. The lower base is connected with the upper cover and includes a light-receiving portion which corresponds to the light-reflecting portion in position and surrounds the optical fiber, thereby receives the light from the light-reflecting portion. The isolating members are disposed between the upper cover and the lower base. The isolating members are located on two sides of the optical housing to prevent the leakage of light from the optical fiber.

DETAILED DESCRIPTION OF THE PREFERRED EMBODIMENTS

Implementation of the present disclosure is hereunder illustrated by specific embodiments. Persons skilled in the art can easily understand other advantages and effects of the present invention by referring to the disclosure contained in the specification.

Figure 1:
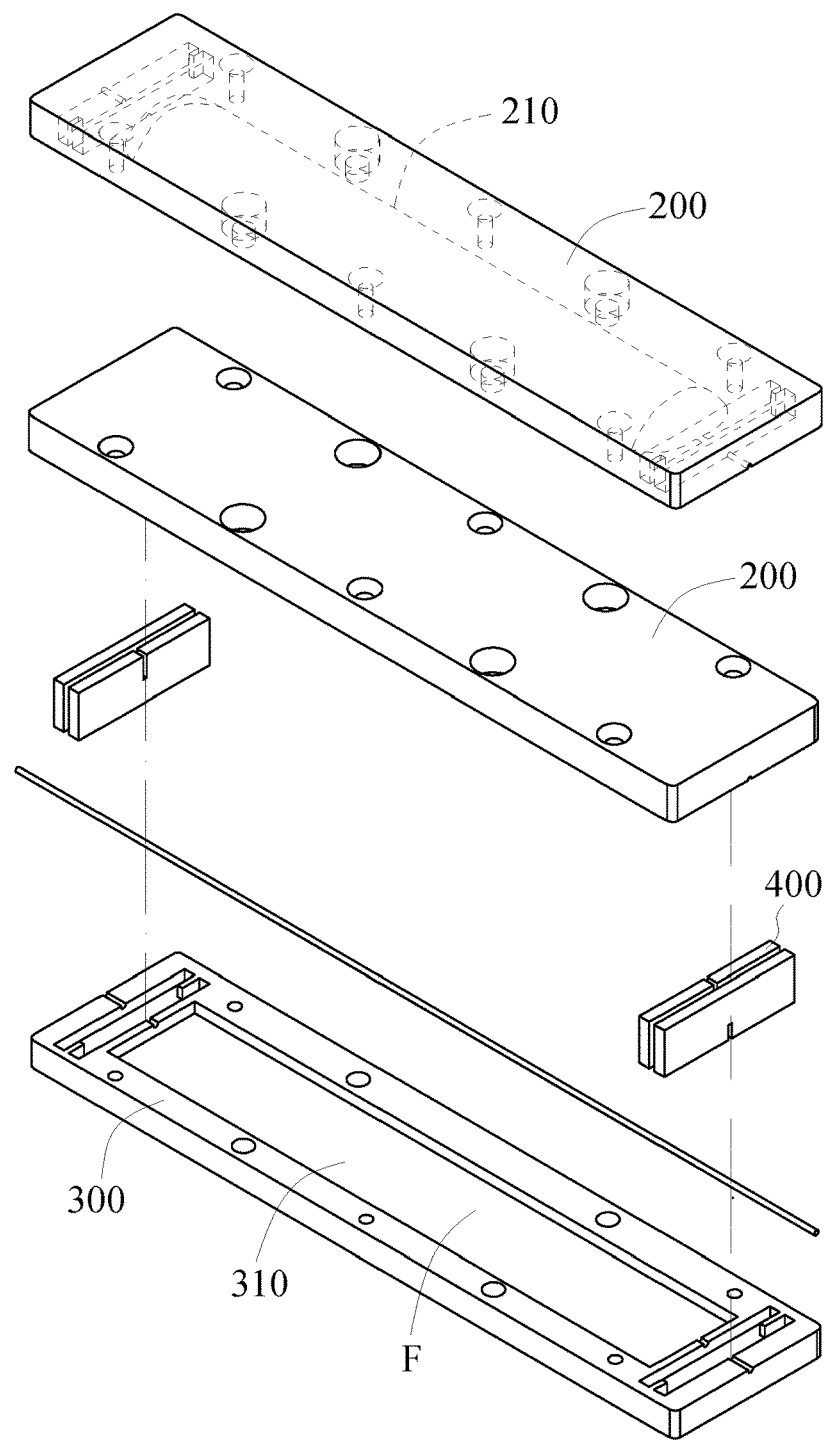
FIG. 1 is an exploded view of an optical housing for high power fiber components to one embodiment of the present disclosure.
Figure 2:
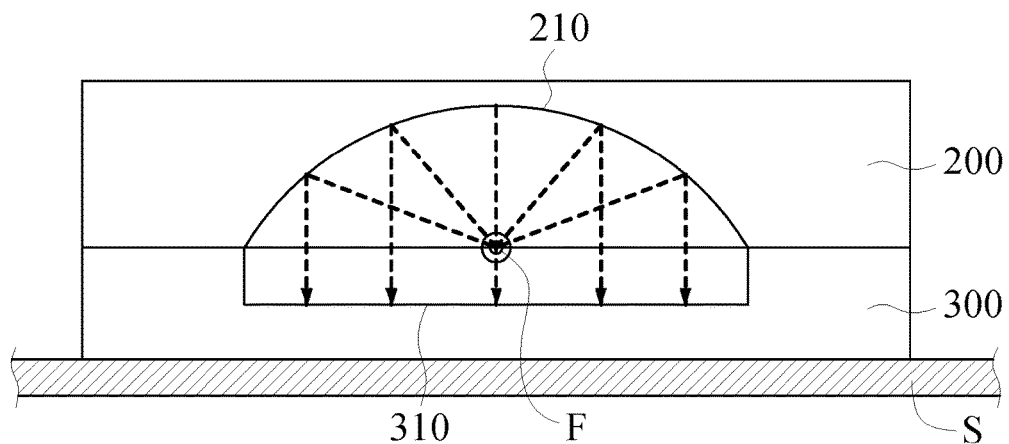
FIG. 2 is a schematic view of FIG. 1 showing the light reflects.

Referring to FIG. 1 and FIG. 2, an optical housing for high power fiber components 100 includes an upper cover 200, a lower base 300, and two isolating members 400. To clearly show the structure of the bottom side of the upper cover 200, the perspective view of the upper cover 200 is additionally shown in FIG. 1. The upper cover 200 includes a light-reflecting portion 210 concaving toward the top. The lower base 300 is connected to the upper cover 200. Corresponding to the light-reflecting portion 210, the lower base 300 includes a light-receiving portion 310 concaving toward the bottom. With the hollow chamber formed by the upper cover 200 and the lower base 300, an optical fiber F is accommodated in the optical housing 100.

In one embodiment, the upper cover 200 and the lower base 300 are metallic, for example, the upper cover 200 and/or the lower base 300 can be but not limited to aluminum or other metal with high thermal conductivity. In the working state, the optical fiber F lights towards the light-reflecting portion 210 and the light-receiving portion 310. Part of the light is absorbed by the light-receiving portion 310 of the lower base 300, and in one embodiment the surface of the light-receiving portion 310 can be black anodized or roughened to enhance the light absorbance. The light-receiving portion 310 absorbs the light and conducts the light as heat to a heat sink S which is connected with the lower base 300 to absorb the heat thereof, thereby to dissipate the heat. Based on the upper cover 200 and the heat sink S are not in contact, the light-reflecting portion 210 is utilized to reflect the light to the light-receiving portion 310 of the lower base 300. As shown in FIG. 2, the light-reflecting portion 210 is formed as parabolic shape. As an alternative, the light-reflecting portion 210 can be formed as semi-circular shape which the radius of curvature is twice as the focal length. Therefore, the shape of the light-reflecting portion 210 should not be a limitation to the present disclosure. Moreover, the surface of the light-reflecting portion 210 can be provided a coating layer or a polishing layer, so as to reflect the light of the optical fiber F to the light-receiving portion 310 as much as possible.

Figure 3:
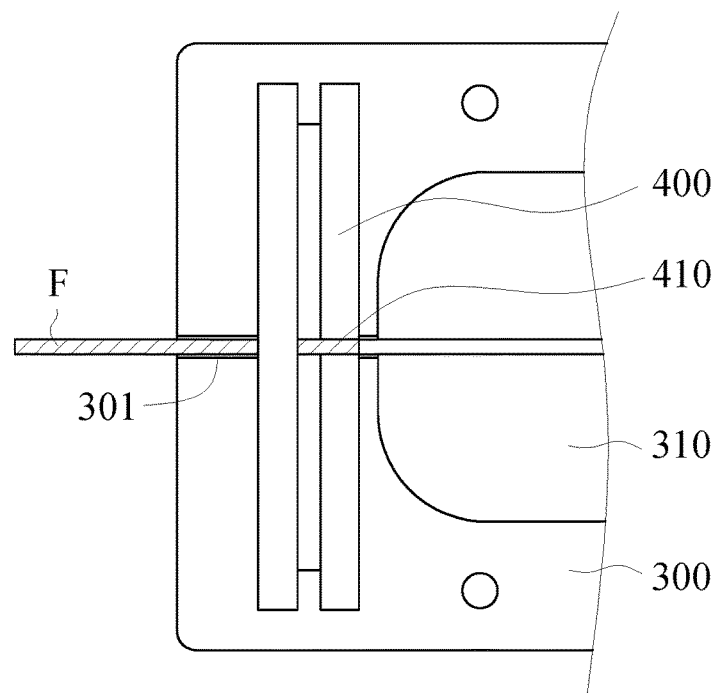
FIG. 3 is a schematic view of FIG. 1 showing the assembly of isolating members and the optical fiber.

Referring to FIG. 1 and FIG. 3, two of the isolating members 400 are disposed between the upper cover 200 and the lower base 300 and located on the front side and the rear side of the optical housing 100 respectively. In one embodiment, the isolating members 400 can be made of materials such as Teflon or ceramics that are opaque, highly heat resistant and with low thermal conductivity. At the inner sides which are relative to the optical housing 100, each of the isolating members 400 includes a guiding groove 410 for clamping the coating layer at the ends of the optical fiber F, so as the optical fiber F is suspended between the light-reflecting portion 210 and the light-receiving portion 310. Further, a positioning groove 301 is axially disposed at the center of the lower base 300. The optical fiber F passes through the guiding groove 410 and is then accommodated in the positioning groove 301, consequently the optical fiber can be stably fixed to the lower base 300.

Compared with the package structure of optical fibers in prior art which dissipates with heat conduction, the present disclosure provides a solution that reflects the light of the optical fibers to avoid the breakage caused by the thermal stress which is due to the adhesive bonding. Moreover, the present disclosure can dissipate the heat without applying the power dissipative material inside the package structure of the optical fiber. The isolating members at two ends of the optical fiber block light from leaking, which protects the adhesive from heat failure and improves the reliability of the components during the operation. The aforementioned embodiment enables the optical fibers to be used in various devices such as a fiber optic combiner, fiber optic cladding power stripper or fiber optic Bragg grating, and also provides the flexibility in design of heat dissipation package structure of the optical fibers.

While the invention has been described by means of specific embodiments, numerous modifications and variations could be made thereto by those skilled in the art without departing from the scope and spirit of the invention set forth in the claims.

What is claimed is:

1. An optical housing for high power fiber components, comprising:
   an upper cover having a light-reflecting portion;
   a lower base connected with the upper cover, the lower base having a light-receiving portion corresponding to the light-reflecting portion, wherein the light-reflecting portion and the light-receiving portion form an accommodating space for accommodating an optical fiber, the light-reflecting portion receives and reflects leakage light of the optical fiber and the light-receiving portion receives the light from the light-reflecting portion; and
   two isolating members disposed between the upper cover and the lower base, the isolating members being located on two sides of the optical housing to prevent the leakage of light from the optical housing;
   wherein a cross section of the light-reflecting portion is parabolic, and a focus of the light-reflecting portion is located at the accommodating space;
   wherein the two isolating members are configured to clamp two ends of the optical fiber respectively for holding the optical fiber at the focus of the light-reflecting portion and suspended between the light-reflecting portion and the light-receiving portion.

2. The optical housing of claim 1, wherein the optical housing is a fiber optic combiner, a fiber optic cladding power stripper or a fiber optic Bragg grating.

3. The optical housing of claim 1, wherein the upper cover and the lower base are metallic.

4. The optical housing of claim 1, wherein at the surface of the light-reflecting portion is a coating layer or a polishing layer.

5. The optical housing of claim 1, wherein a surface of the light-receiving portion is a black anodized layer or a roughened layer.

6. The optical housing of claim 1, wherein the two isolating members are made of polytetrafluoroethylene or ceramic.

7. The optical housing of claim 1, wherein each of the two isolating members comprises a guiding groove, and the two ends of the optical fiber are contained in the guiding grooves.

* * * * *